United States Patent [19]

Trautloff

[11] Patent Number: 4,592,596
[45] Date of Patent: Jun. 3, 1986

[54] AXLE ASSEMBLY FOR ALL-TERRAIN AND LIKE VEHICLES

[76] Inventor: Gary Trautloff, 14911 "B" Moran, Westminster, Calif. 92683

[21] Appl. No.: 647,230

[22] Filed: Sep. 5, 1984

[51] Int. Cl.⁴ .............................................. B60B 35/04
[52] U.S. Cl. .................................. 301/132; 301/124 R; 180/217
[58] Field of Search .................... 301/125, 126, 124 R, 301/111, 131, 132, 112, 5.3, 5.7; 180/215, 217

[56] References Cited

U.S. PATENT DOCUMENTS

| | | | |
|---|---|---|---|
| 4,381,874 | 5/1983 | Strader | 301/126 |
| 4,463,964 | 8/1984 | Takayanagi et al. | 180/215 |
| 4,541,502 | 9/1985 | Iwai et al. | 180/217 |

*Primary Examiner*—David A. Scherbel
*Assistant Examiner*—Carol L. Olson
*Attorney, Agent, or Firm*—Louis J. Bachand

[57] ABSTRACT

An improvement in an axle assembly for off-road vehicles 10 having a swing arm 18 carrying left and right rear wheels 20 in which the assembly comprises an elongated shaft 22 centrally journaled in thread-lockable relation on the swing arm and having left and right hand end portions defining wheel mounting hubs 44 outboard of the swing arm in a manner subjecting the shaft portion 50 between the hubs and the swing arm to severe bending moments likely to cause cracking in shaft threaded portions 48, comprising thread-lockable shaft locking apparatus separable from the shaft, the locking apparatus including an internally threaded nut 62, an exteriorly threaded slide 60 nonrotatably keyed to the shaft, and shoulder device 68, 70 opposing the slide in blocking relation responsive to threaded adjustment of the nut on the slide to lock the shaft relative to the swing arm free of cracking-prone threading on the shaft.

10 Claims, 5 Drawing Figures

U.S. Patent   Jun. 3, 1986   Sheet 1 of 2   4,592,596
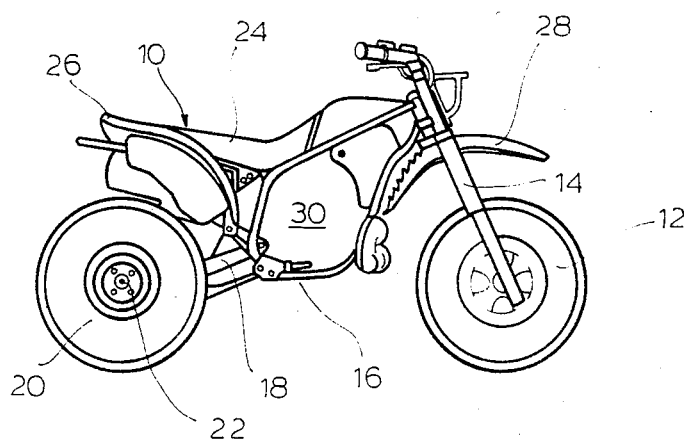
Fig. 1
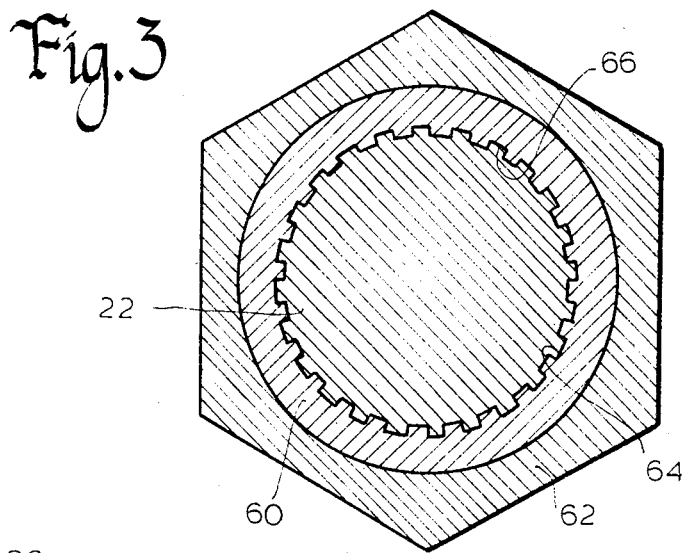
Fig. 3
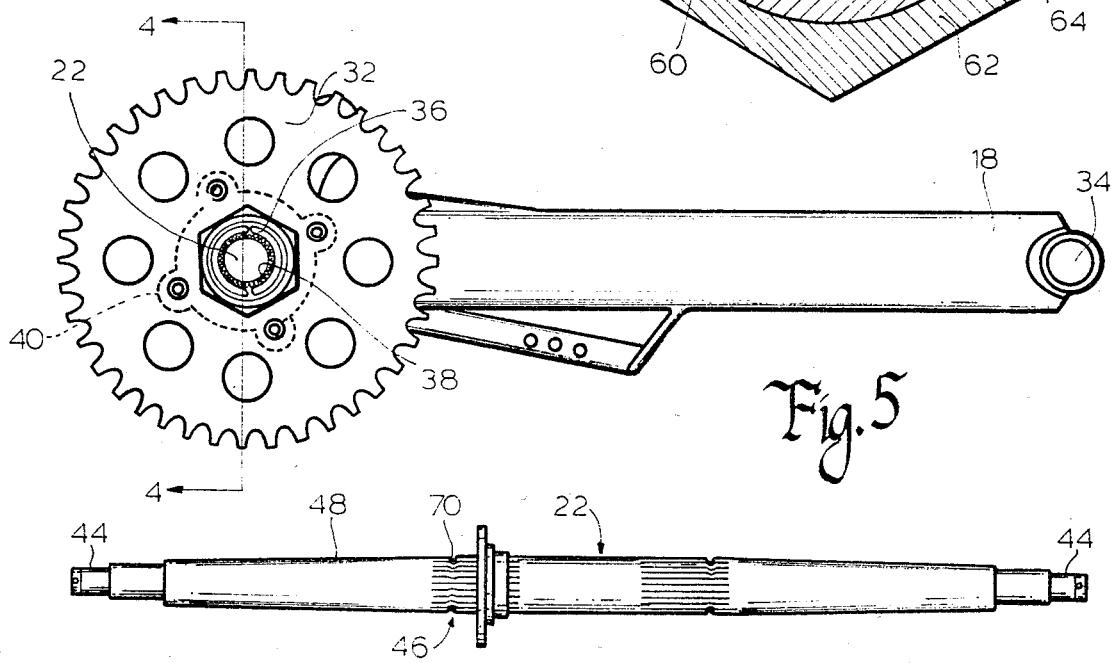
Fig. 2
Fig. 5

AXLE ASSEMBLY FOR ALL-TERRAIN AND LIKE VEHICLES

TECHNICAL FIELD

This invention has to do with axle assemblies and more particularly with improvements in such assemblies for carrying the rear wheels of all-terrain vehicles on a swing arm.

An increasingly popular sport is the off-road use of small three and four wheel vehicles, sometimes referred to as all-terrain vehicles which can be driven over rough country and even over motocross courses at considerable speed for sport or competition. Typically a motorcycle style front is coupled to a two wheel version of a motorcycle rear end comprising a rear axle driven by a chain drive, and a swing arm supporting the rear axle and pivoted to the vehicle frame.

BACKGROUND ART

The rear axle extends left and right from the swing arm outward to the wheels which are mounted to hubs defined by the axle and its unsupported portions beyond the swing arm and before the wheel are subjected to severe bending, even as the axle is under driving rotation, as the vehicle bounces and pitches over rocks, jumps and ruts, often turning the wheel under on landing. To relatively position the axle and the swing arm requires locking means be provided on the axle outwardly adjacent the swing arm, in the very axle shaft area which is subjected to the bending moments.

Typically the locking means has been a nut threaded onto the axle shaft adjacent the swing arm, but the shaft threading induces cracks in the axle shaft under the inevitable severe bending stress, posing safety hazards and necessitating unduly frequent replacement of the axle. In addition hardness of the shaft material has been limited by need to accommodate tendencies to crack at the threads.

DESCRIPTION OF THE INVENTION

It is therefore among the objects of the invention to provide in an axle assembly for off-road vehicles having a swing arm carrying left and right rear wheels in which the assembly comprises an elongated shaft centrally journaled in thread-lockable relation on the swing arm and having left and right hand end portions defining wheel mounting hubs outboard of the swing arm in a manner subjecting the shaft between the hubs and the swing arm to severe bending moments likely to cause cracking in shaft threaded portions, the improvement comprising thread-lockable shaft locking means separable from the shaft, the locking means including an internally threaded nut, an exteriorly threaded slide nonrotatably keyed to the shaft, and shoulder means opposing the slide in blocking relation responsive to threaded adjustment of the nut on the slide to lock the shaft relative to the swing arm free of cracking-prone threading on the shaft.

In specific embodiments of the invention: the shaft and slide are in splined engagement; the shoulder means comprises a ring circumdisposed about the shaft in binding relation responsive to engagement with the slide to retain the shaft position relative to the swing arm; the locking means are disposed on both sides of the swing arm; or, the shaft is splined immediately adjacent the swing arm for nonrotatably keying the slide to the shaft.

In particularly preferred embodiments, the shaft splined portion is transversely circumferentially grooved and the shoulder means comprises a split ring partially receiveable in the groove, the slide is dimensioned to trap the ring in the groove in ring retaining relation; the slide is interiorly splined to the shaft, and exteriorly threaded for threaded engagement with the nut, and the nut forces the slide outward against the split ring to lock the shaft relative to the swing arm.

In a specific preferred embodiment there is provided in accordance with the invention in an axle assembly for off-road vehicles having a swing arm carrying left and right rear wheels in which the assembly comprises an elongated rigid metal shaft centrally journaled in thread-lockable relation on the swing arm and having left and right hand end portions defining wheel mounting hubs outboard of the swing arm in a manner subjecting the shaft between the hubs and the swing arm to severe bending moments likely to cause cracking in shaft threaded portions, the improvement comprising thread-lockable shaft locking means separable from the shaft, the locking means including on each side of the shaft an internally threaded nut, an exteriorly threaded slide splined to the shaft, and shoulder means comprising a split ring engaging the slide in blocking relation responsive to inward threaded adjustment of the nut on the shaft and corresponding outward movement of the slide to relatively lock the shaft and swing arm while maintaining the shaft free of threading prone to cracking under severe bending moments.

As will be apparent from the foregoing, the invention is concerned with improvements in methods and means of mounting an axle shaft to a swing arm in an all-terrain vehicle in which the driving sprocket is fixed to the shaft. Such axle shafts are subject to severe bending loads and while rotating as well so that the former practice of threading a retaining nut dirctly onto the shaft is unacceptable since the threads induce cracking in their vicinity ultimately destroying the shaft and requiring replacement.

The invention addresses this problem by providing a separable threaded element, a slide, which provides the functions of a directly threaded axle but avoids the problems of a directly threaded axle, and means to retain the slide including retaining rings which are trapped by the slide as the retaining nut is tightened to secure the axle relative to the swing arm journal therefor.

THE DRAWING

The invention will be further described as to an illustrative embodiment in conjunction with the accompanying drawing in which:

FIG. 1 is a side elevation view of a typical all-terrain vehicle for which the present invention is suited;

FIG. 2 is a side elevation view of the swing arm and axle assembly acording to the invention;

FIG. 3 is a view in section of the axle assembly taken on line 3—3 in FIG. 4;

PREFERRED MODES

Figure 4:
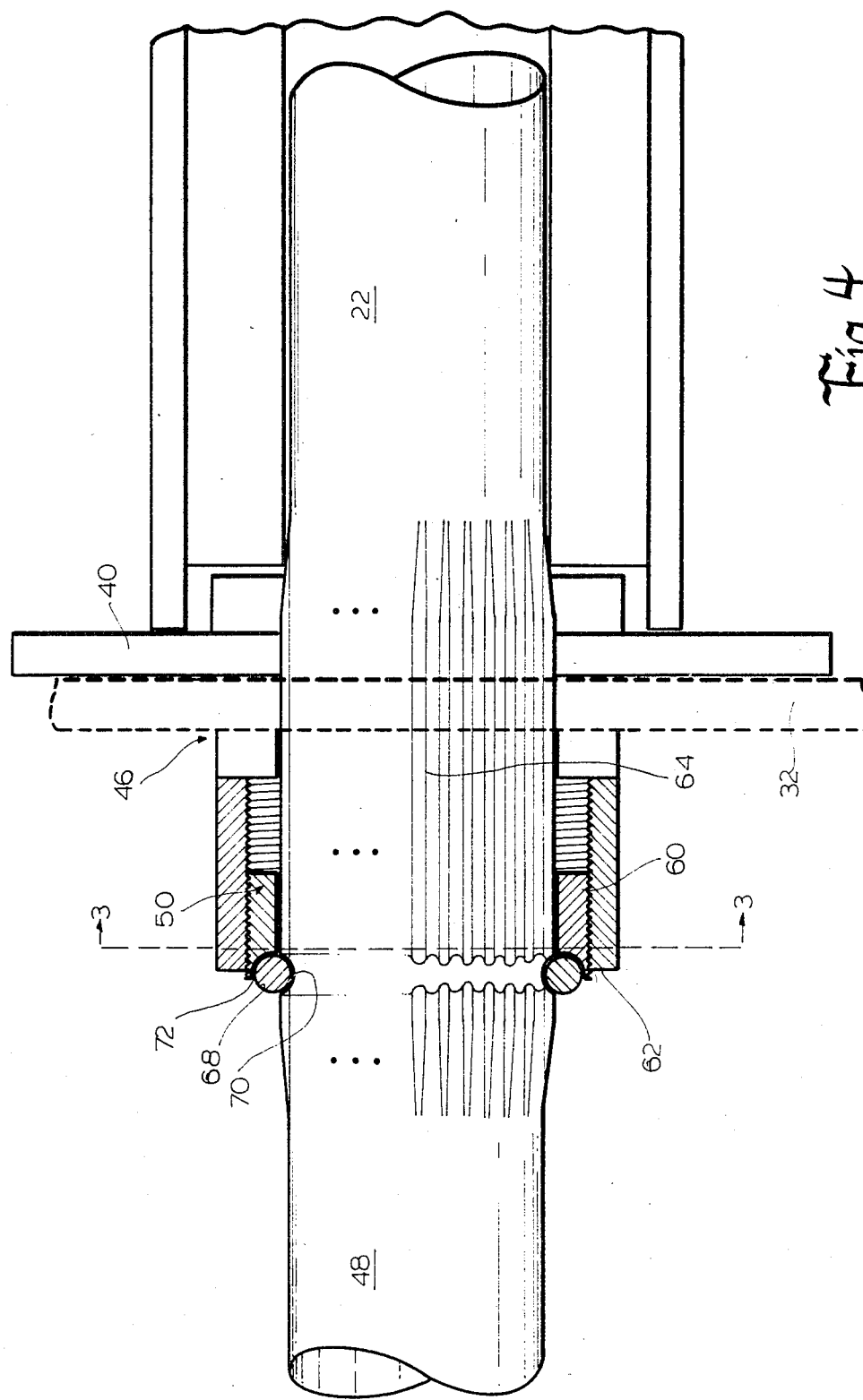
FIG. 4 is a view in vertical section of the axle assembly taken at line 4—4 in FIG. 2, and enlarged; and, FIG. 5 is an elevational view of the assembly shaft according to the invention.

With reference now to the drawings in detail, in FIG. 1 an all-terrain vehicle, commonly called an ATC, is shown at 10, and includes a single front wheel 12, front fork 14, frame 16, rear wheel swing arm 18 and a pair of rear wheels 20 carried on a single axle shaft 22. A seat 24, fenders 26, 28 and engine 30 which is coupled to sprocket 32 (FIG. 2) by chain mean not shown are other prominent components of the ATC 10.

With particular reference to FIGS. 2, 3, 4 and 5, swing arm 18 defines a pivot connection 34 for mounting to frame 16 at one end and a shaft journal 36 at the opposite end with bearings 38 therein for journaling shaft 22. Sprocket 32 is bolted to the shaft via welded plate 40 and bolts 42. Hubs 44 are defined at opposites ends of the shaft 22 for mounting rear wheels 20. The locus of swing arm 18 journaling of the shaft 22 is indicated at 46 in FIG. 5. Between the hubs 44 and the journaling locus 46 there is an unsupported portion 48 of the shaft 22 which is subjected to severe bending moments even while turning to drive the wheels of the ATC. This flexing tends to concentrate just adjacent the journaling locus 46 such that threading in the area 50 will cause cracking of the shaft 22 initiated in the root of the thread.

As best shown in FIG. 4 shaft 22 is positioned relative to journal 36 of swing arm 18 and locked there without need of threading the shaft in region 48 by interposing a slide 60 between the nut 62 and the shaft region 48. In this manner the nut 62 can be threaded onto the shaft 22 and tightened without need of threading on the shaft. The slide 60 is cylindrical and exteriorly threaded to cooperate with the interior threading of the nut 62 as shown. The slide 60 is keyed to the shaft 22 so as to not rotate when threaded against the nut 62. Preferably keying is accomplished by splining the shaft at 64 and slide interior at 66 for sliding but nonrotating engagement as shown. Splining of the shaft 22, unlike threading, does not induce cracking as the shaft is flexed on its longitudinal axis, enabling longer shaft life.

By using splines in the shaft 22 according to the invention rather than threading, thus avoiding the cracking problem, greater hardnesses of steel can be used adding further to safety and shaft life.

The slide 60 is shifted outwardly by tightening of the nut 62. A split retaining ring 68 is detented in shaft circumferential groove 70 to oppose outward movement of the slide 60. The outward face 72 of the slide 60 is recessed to receive the ring 68 partially as seen in FIG. 4, thereby overlying and retaining the ring in groove 70.

Mounting and tightening nut 62 and slide 60 of the axle locking assembly on either side of the swing arm 18 fixes the position of the shaft 22 relative to the swing arm and without use of threads cut into the shaft.

I claim:

1. In an axle assembly for off-road vehicles having a swing arm carrying left and right rear wheels in which said assembly comprises an elongated shaft centrally journaled in thread-lockable relation on said swing arm and having left and right hand end portions defining wheel mounting hubs outboard of said swing arm in a manner subjecting the shaft between said hubs and said swing arm to severe bending moments likely to cause cracking in shaft threaded portions, the improvement comprising thread-lockable shaft locking means separable from said shaft, said locking means including an internally threaded nut, an exteriorly threaded slide nonrotatably keyed to said shaft, and shoulder means opposing said slide in blocking relation responsive to threaded adjustment of said nut on said slide to lock said shaft relative to said swing arm free of cracking-prone threading on said shaft.

2. Axle assembly according to claim 1, in which said shaft and slide are in splined engagement.

3. Axle assembly according to claim 1, in which said shoulder means comprises a ring circumdisposed about said shaft in binding relation responsive to engagement with said slide.

4. Axle assembly according to claim 1, in which said locking means are disposed on both sides of said swing arm.

5. Axle assembly according to claim 1, in which said shaft is splined immediately adjacent said swing arm for nonrotatably keying said slide to said shaft.

6. Axle assembly according to claim 5, in which said shaft splined portion is transversely circumferentially grooved and said shoulder means comprises a split ring partially receiveable in said groove.

7. Axle assembly according to claim 6, in which said slide is dimensioned to trap said ring in said groove in ring retaining relation.

8. Axle assembly according to claim 7, in which said slide is interiorly splined to said shaft, and exteriorly threaded for threaded engagement with said nut.

9. Axle assembly according to claim 8, in which said nut forces said slide outward against said split ring to lock said shaft relative to said swing arm.

10. In an axle assembly for off-road vehicles having a swing arm carrying left and right rear wheels in which said assembly comprises an elongated rigid metal shaft centrally journaled in thread-lockable relation on said swing arm and having left and right hand end portions defining wheel mounting hubs outboard of said swing arm in a manner subjecting the shaft between said hubs and said swing arm to severe bending moments likely to cause cracking in shaft threaded portions, the improvement comprising thread-lockable shaft locking means separable from said shaft, said locking means including on each side of said shaft an internally threaded nut, an exteriorly threaded slide splined to said shaft, and shoulder means comprising a split ring engaging said slide in blocking relation responsive to inward threaded adjustment of said nut on said shaft and corresponding outward movement of said slide to relatively lock said shaft and swing arm while maintaining said shaft free of threading prone to cracking under severe bending moments.

* * * * *